United States Patent
Aoki et al.

(10) Patent No.: US 11,745,782 B2
(45) Date of Patent: Sep. 5, 2023

(54) STROLLER SEAT AND STROLLER SEAT WITH ELECTRIC FAN

(71) Applicant: SFT LABORATORY CO., LTD., Tokyo (JP)

(72) Inventors: Daiyu Aoki, Yokohama (JP); Yohei Oki, Tokyo (JP); Manabu Isei, Tokyo (JP); Nagomi Yoshizaki, Tokyo (JP); Yuji Sumiyoshi, Tokyo (JP); Akina Kawada, Tokyo (JP); Tomoyuki Iwabuchi, Tokyo (JP)

(73) Assignee: SFT LABORATORY CO., LTD., Tokyo (JP)

( * ) Notice: Subject to any disclaimer, the term of this patent is extended or adjusted under 35 U.S.C. 154(b) by 0 days.

(21) Appl. No.: 17/622,397

(22) PCT Filed: Jun. 18, 2020

(86) PCT No.: PCT/JP2020/023877
§ 371 (c)(1),
(2) Date: Dec. 23, 2021

(87) PCT Pub. No.: WO2020/262180
PCT Pub. Date: Dec. 30, 2020

(65) Prior Publication Data
US 2022/0355845 A1 Nov. 10, 2022

(30) Foreign Application Priority Data
Jun. 24, 2019 (JP) ................................. 2019-116300

(51) Int. Cl.
*B62B 9/14* (2006.01)
*B62B 9/10* (2006.01)

(52) U.S. Cl.
CPC ................ *B62B 9/14* (2013.01); *B62B 9/102* (2013.01)

(58) Field of Classification Search
CPC .. B62B 9/14; B62B 9/102; B60N 2/56; B60N 2/5621; B60N 2/5642; B60N 2/565; B60N 2/5657
See application file for complete search history.

(56) References Cited

FOREIGN PATENT DOCUMENTS

| CN | 206968461 U | 2/2018 |
|---|---|---|
| CN | 108784141 A | 11/2018 |

(Continued)

OTHER PUBLICATIONS

International Search Report (ISR) (and English translation thereof) dated Aug. 25, 2020, issued in International Application No. PCT/JP2020/023877.

(Continued)

*Primary Examiner* — John D Walters
(74) *Attorney, Agent, or Firm* — Holtz, Holtz & Volek PC

(57) ABSTRACT

A stroller seat is mounted on a stroller and is provided with: a main part extending from a backrest to a seating part of the stroller and having a space therein through which air flows; an extension part protruding from at least one of the two side portions of the main body and having a space therein which communicates with the space of the main body; and a fan attachment part which is provided on the extension part and to which an electric fan can be attached. The main body has, on a surface to be in contact with a human body, an air discharge unit for discharging air therein to the outside. Air introduced by the electric fan attached to the fan attachment part flows into the main body through the extension part.

4 Claims, 3 Drawing Sheets

(56) References Cited

FOREIGN PATENT DOCUMENTS

| | | | |
|---|---|---|---|
| DE | 202011050088 U1 * | 9/2011 | ............ A47C 7/744 |
| JP | 2014148236 A | 8/2014 | |
| KR | 101821146 B1 | 1/2018 | |
| KR | 101851522 B1 | 4/2018 | |
| KR | 200486474 Y1 * | 5/2018 | |
| KR | 20190002168 A | 1/2019 | |
| KR | 20190066447 A | 6/2019 | |

OTHER PUBLICATIONS

Written Opinion dated Aug. 25, 2020, issued in International Application No. PCT/JP2020/023877.
International Preliminary Report on Patentability (IPRP) (and English language translation thereof) dated Dec. 28, 2021, issued in International Application No. PCT/JP2020/023877.
Extended European Search Report (EESR) dated Jun. 30, 2022, issued in counterpart European Application No. 20831271.0.

* cited by examiner

STROLLER SEAT AND STROLLER SEAT WITH ELECTRIC FAN

TECHNICAL FIELD

The present invention relates to a stroller seat and a stroller seat with as electric fan which are put on a stroller.

BACKGROUND ART

Conventionally, a stroller seat which is put on a stroller from a backrest to a seat of the stroller is known (see, for example, Patent Literature 1).

A stroller seat with an electric fan is also known as such a stroller seat. An electric fan is mounted at a lower end is a longitudinal direction. Air taken is by the electric fan is discharged to the outside through an inner space. The electric fan is located at a portion that hangs from a seat while the stroller seat with the electric fan is put on the stroller.

CITATION LIST

Patent Literature

Patent Literature 1: JP 2014-148236 A

SUMMARY OF INVENTION

Technical Problem

However, in the conventional stroller seat with the electric fan, the electric fan is positioned below the seat of the stroller. Therefore, dirty air, including dust rolled up from the ground during moving, is sucked inside. That is not hygienically desirable.

When an infant's foot hits the electric fan, air intake is obstructed. It causes a problem of reduced efficiency.

An object of the present invention is to provide a stroller seat and a stroller seat with an electric fan that realizes more hygienic and efficient cooling.

Solution to Problem

A first aspect of the invention is a stroller seat which is put on a stroller and which includes: a main body which extends from a backrest to a seat of the stroller and which includes an inner space where air circulates; an extension which projects from at least one of both sides of the main body and which includes an inner space communicating with the inner space of the main body; and a fan mount which is provided in the extension and on which an electric fan can be mounted. The main body includes, on a side to be in contact with a human body, an air outlet which discharges inner air outward, and air introduced by the electric fan mounted on the fan mount flows into the main body through the extension.

According to a second aspect of the invention, the extension is a pair of extensions protruding in left and right directions from both sides of the main body, the fan mount is provided in one of the pair of extensions, and the stroller seat further includes a power source storage which is provided in another of the pair of extensions and in which a power source that drives the electric fan is stored.

According to a third aspect of the invention, the extension is located at a position that allows the extension to hang from an armrest of the stroller while the stroller seat is put on the stroller.

According to a fourth aspect of the invention, the fan mount includes a mount hole, and the electric fan is mounted so as to cover the mount hole.

According to a fifth aspect of the invention, the main body includes a spacer for securing the inner space.

A sixth aspect of the invention is a stroller seat with an electric fan, including: the stroller seat according to one of the aspects described above, and the electric fan mounted on the fan mount.

Advantageous Effects of Invention

The invention realizes more hygienic and efficient cooling when it is put on a stroller.

DESCRIPTION OF EMBODIMENTS

Figure 1:
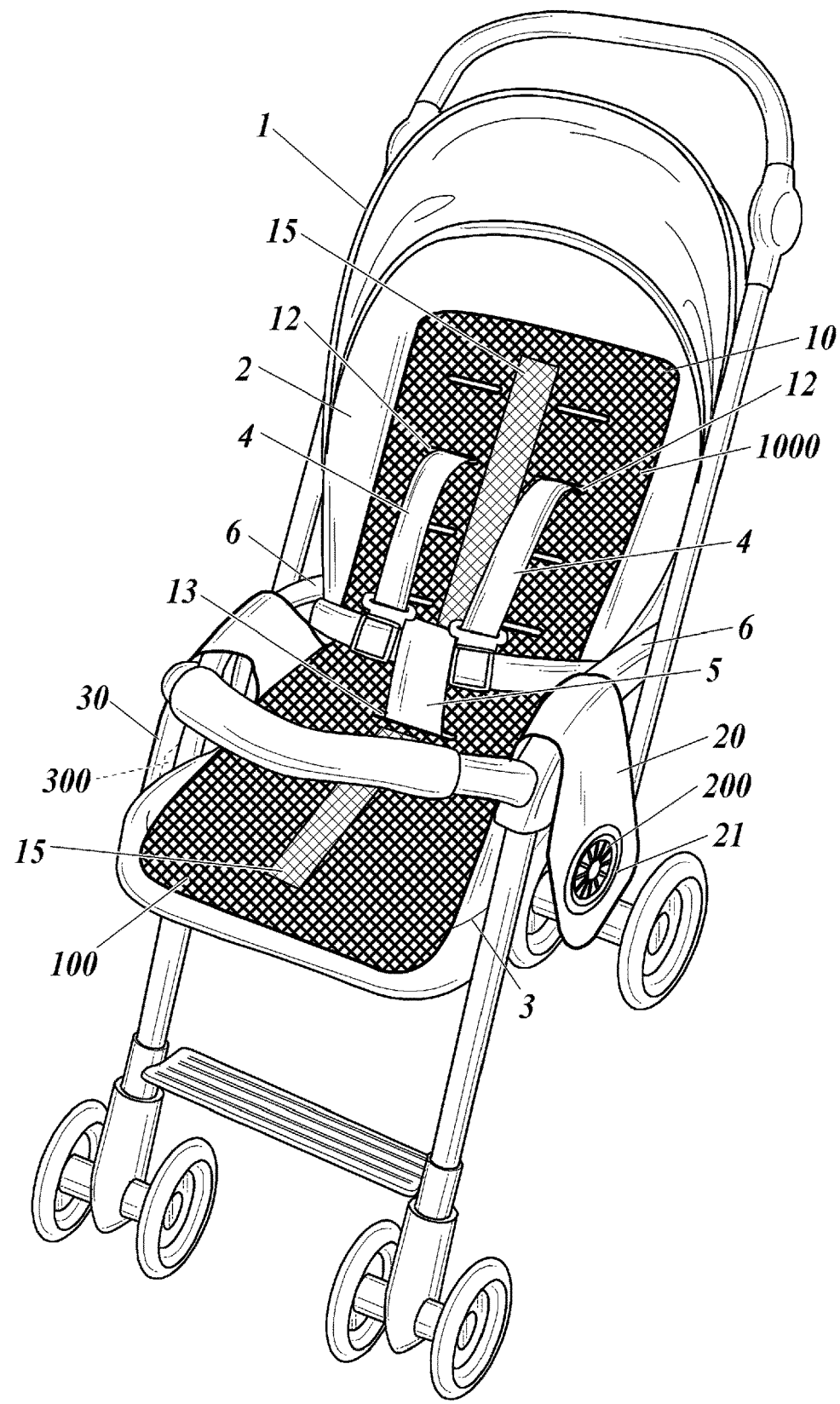
FIG. 1 is a perspective view of a stroller seat with an electric fan according to an embodiment while being put on a stroller.

An embodiment of a stroller seat and a stroller seat with an electric fan according to the invention will be described in detail with reference to the drawings. The embodiment described below have various technically preferable limitations for carrying out the invention. However, they do not limit the scope of the claims of the invention to the following embodiment and the example in the drawings.

An electric fan-equipped stroller seat 1000 according to the embodiment is put on a stroller 1, for example, from a backrest 2 to a seat 3 of the stroller 1 as shown in FIG. 1.

Stroller Seat with Electric Fan

Figure 2:
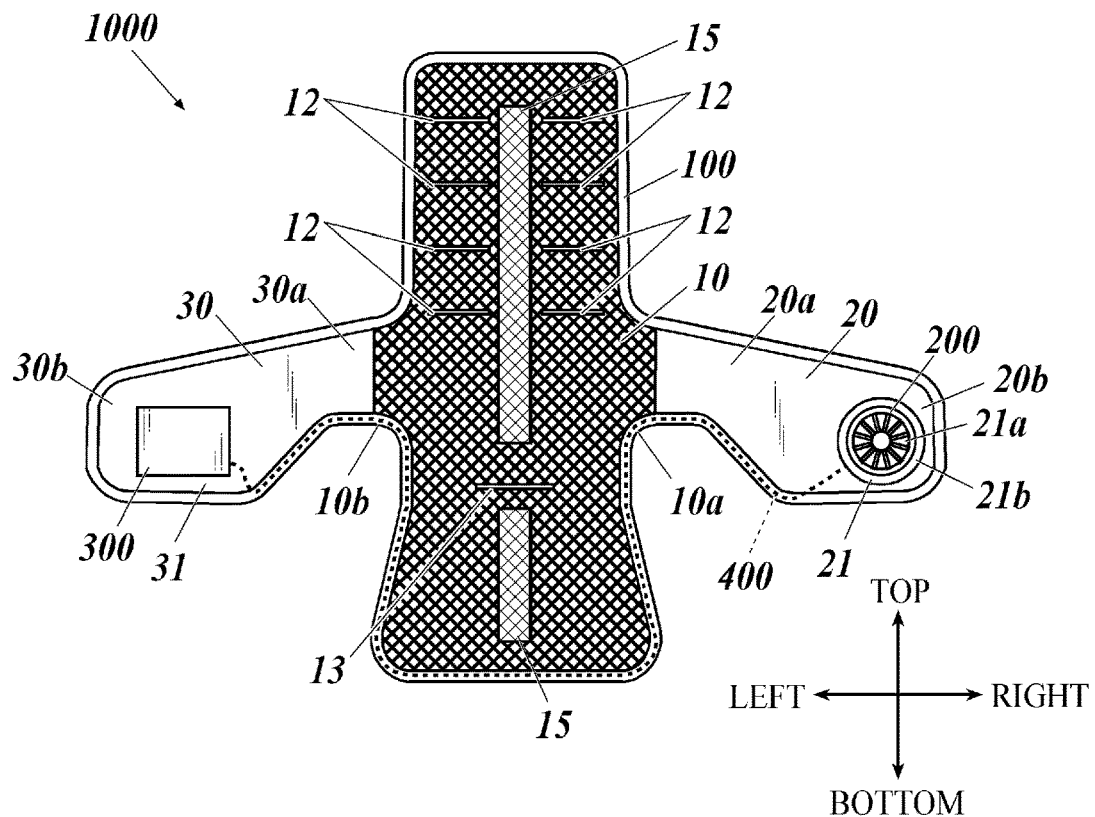
FIG. 2 is a front view of the stroller seat with the electric fan according to the embodiment.
Figure 3:
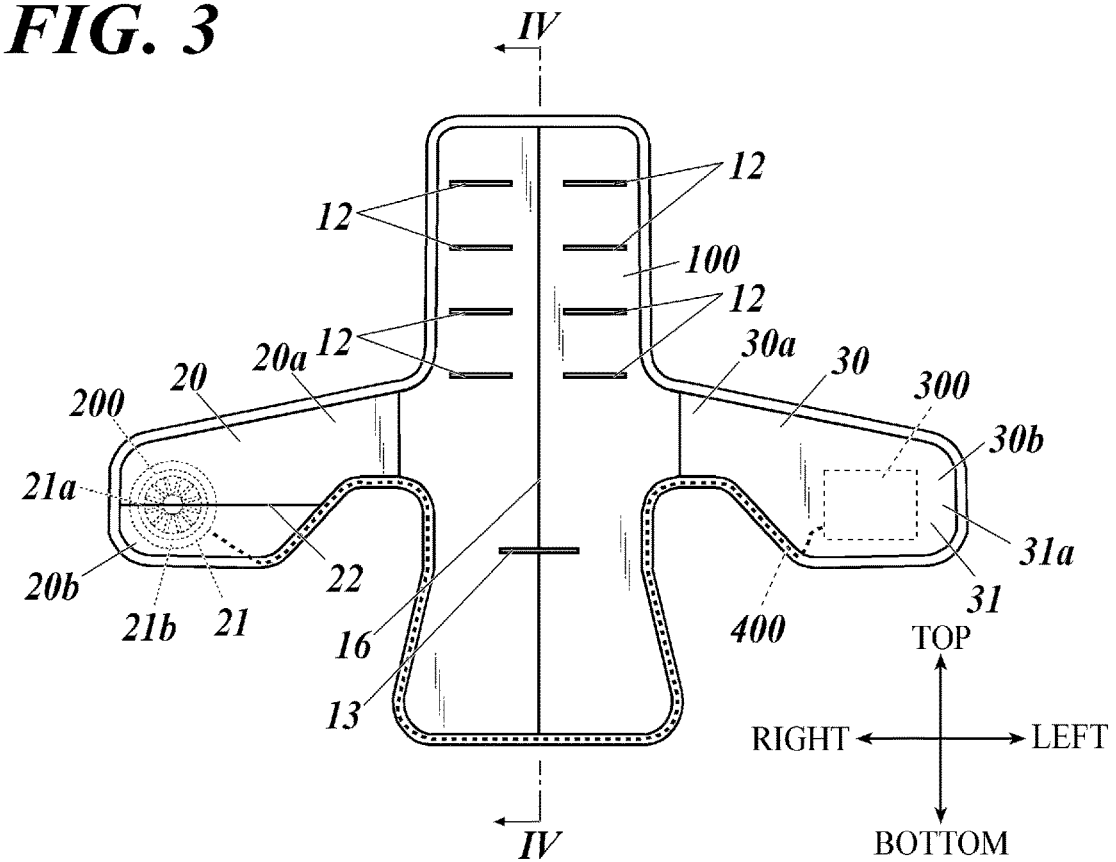
FIG. 3 is a rear view of the stroller seat with the electric fan according to the embodiment.

For example, as shown in FIGS. 1 to 3, an electric fan-equipped stroller seat 1000 includes:

a stroller seat 100;

an electric fan 200 that introduces air into an interior of the stroller seat 100;

a power source 300 that supplies power to the electric fan 200; and a power cable 400 that electrically connects the power source 300 with the electric fan 200.

The electric fan 200 circulates air drawn into the stroller seat 100. It evaporates sweat from a body of an infant sitting in the stroller 1. Heat of vaporization generated by evaporating sweat cools the body.

Stroller Seat

The stroller seat 100 includes: a main body 10 which extends from the backrest 2 to the seat 3 of the stroller 1 and which includes an inner space where air circulates; and a pair of left and right extensions 20, 30 which projects from both side portions 10*a*, 10*b* of the main body 10 and which includes inner spaces connected to the inner space of the main body 10.

Main Body

The main body 10 includes air outlets 15 that discharge inner air outward. When the main body 10 is put on the stroller 1, the air outlets 15 are on a front side (seat side), which is the side to be in contact with a human body.

The air outlets 15 extend along a longitudinal direction at the center in a width direction on the front side of the main body 10. For example, the air outlets 15 are formed solely of a breathable material comprising a mesh fabric such as double raschel. On the front side of the body 10, except for the air outlets 15, a non-breathable material is affixed to a back side of the breathable material. It allows inner air to be discharged outward only through the air outlets 15.

The breathable material constituting the front side of the main body 10 can be any material as long as it is breathable.

A material of the back side, which is the side in contact with the stroller, is not limited. It is preferably less breathable than the front side and more preferably not breathable.

Figure 4:
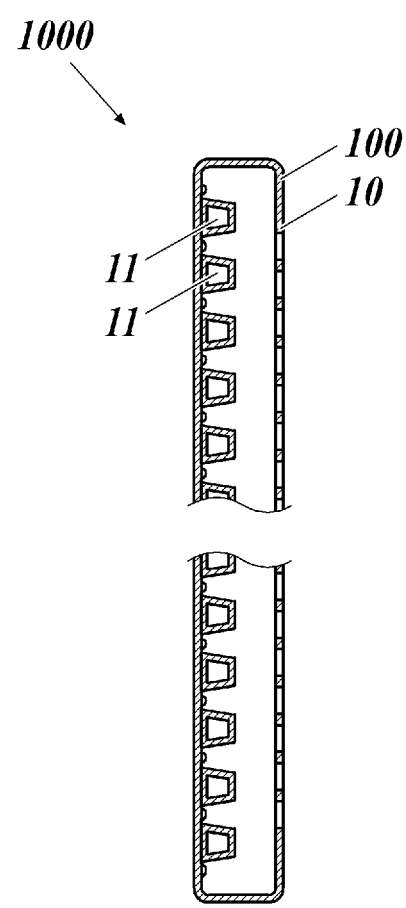
FIG. 4 is a cross-sectional view taken along the line IV-IV in FIG. 3.

As shown in FIG. 4, spacers 11 are disposed inside the main body 10. The spacers 11 ensure inner spaces for air to circulate while an infant is sitting.

A fastener 16 for putting the spacers 11 in and out of the interior is provided on the back side of the main body 10.

The main body 10 includes shoulder belt holes 12 at positions opposite the backrest 2 when put on the stroller 1. The shoulder belt holes 12 are for passing shoulder belts 4 of the stroller 1. The main body 10 also includes a crotch belt hole 13 at a position opposite the seat 3. The crotch belt hole 13 is for passing a crotch belt 5 of the stroller 1.

A pair of shoulder belt holes 12 are provided at left and right portions of the main body 10. A plurality of pairs are provided along a vertical direction.

The single crotch belt hole 13 is provided at the center of the main body 10 in a left-right direction and is lower than the center in the vertical direction.

Extensions

As shown in FIGS. 2 and 3, a pair of extensions 20, 30 projects outward from both side portions 10*a*, 10*b* at approximately the center of the main body 10 in the vertical direction. The pair of extensions 20, 30 has inner spaces communicating with the space of the main body 10.

The pair of extensions 20, 30 is symmetrical. Base portions 20*a*, 30*a* are narrower in the vertical direction than tip portions 20*b*, 30*b*. As shown in FIG. 1, when the stroller seat is put on the stroller 1, the pair of extensions 20, 30 hangs from armrests 6 of the stroller 1.

The extension 20 should be made of a non-breathable material. The extension 20 makes at least air draws in from outside by the electric fan 200 flow into the main body 10.

Spacers (not shown) similar to the spacers 11 are disposed in two layers (double) inside the extension 20. They ensure inner spaces for air to circulate while the extensions are hanging from the armrests 6 of the stroller 1.

A fastener 22 for putting the spacers in and out of the interior is provided on a back of the extension 20.

A fan mount 21 on which the electric fan 200 can be mounted is formed in the extension 20 on the right (one) side of the pair of extensions 20, 30.

The fan mount 21 includes:
a circular mount hole 21*a* provided on the front side; and
a reinforcement member 21*b* that reinforces a rim of the mount hole 21*a*.

The electric fan 200 is fixed to the reinforcement member 21*b* so as to cover the mount hole 21*a*.

Of the pair of extensions 20, 30, the left (other) extension 30 includes a pocket-shaped power source storage 31 in which the power source 300 that drives the electric fan 200 is stored.

Electric Pan

As shown in FIGS. 1 and 2, the electric fan 200 is inserted through the mount hole 21*a* to be mounted on the stroller seat 100. The electric fan 200 introduces air into the stroller seat 100 from the outside through the mount hole 21*a*.

Required power is supplied to the electric fan 200 from the power source 300 through the power cable 400.

A configuration of the electric fan 200 can be any as long as it can be attached to the stroller seat 100 to cover the mount hole 21*a* and can introduce air into the interior of the stroller seat 100.

Power Source

The power source 300 is a component that supplies power to the electric fan 200. For example, a lithium-ion battery with a safety protection circuit is built in the power source 300. The power source 300 is connected to the electric fan 200 through the power cable 400.

A controller (not shown) for turning on and off the electric fan 200 and for adjusting an air speed is built in the power source 300. The controller can be operated remotely by a remote controller.

A specific configuration of the power source 300 can be any as long as it can supply power to the electric fan 200.

Power Cable

The power cable 400 is a cable that electrically connects the power source 300 to the electric fan 200. Power required for operation of the electric fan 200 is supplied to the electric fan 200 from the power source 300 through the power cable 400. As shown in FIG. 2, the power cable 400 is disposed along edges of the main body 10 and the pair of extensions 20, 30. The power cable 400 is retained on the inner side of the stroller seat 100.

A specific configuration of the power cable 400 and its placement within the stroller seat 100 can be any as long as the power source 300 can supply the electric fan 200 with power required for operation of the electric fan 200.

As described above, the stroller seat 100 and the electric fan-equipped stroller seat 1000 according to the embodiment includes:
the main body 10 which extends from the backrest 2 to the seat 3 of the stroller 1 and which includes the inner space where air circulates;
the extension 20 which projects from the side portion 10*a* of the main body 10 and which includes the inner space communicating with the inner space of the main body 10; and the fan mount 21 provided in the extension 20 and on which the electric fan 200 can be mounted.

The main body 10 includes the air outlets 15 on the side to be in contact with a human body. The air outlets 15 discharge inner air outward. Wind generated by the electric fan 200 mounted on the fan mount 21 flows into the main body 10 through the extension 20. It makes a position of air introduction hither. Cleaner air is introduced than before. It is more hygienic.

The stroller seat 100 and the electric fan-equipped stroller seat 1000 according to the embodiment reduce possibility of an infant's foot coming into contact with the electric fan 200. It is more efficient.

In the stroller seat 100 and the electric fan-equipped stroller seat 1000 according to the embodiment, the fan mount. 21 is provided in the one extension 20. The power source storage 31 is provided in the other extension 30. It improves balance between left and right.

In the stroller seat 100 and the electric fan-equipped stroller seat. 1000 according to the embodiment, the pair of extensions 20, 30 is at positions that allow them to hang from the armrests 6 of the stroller 1 while they are put on the stroller 1. The electric fan 200 is separated from the ground more reliably.

In the stroller seat 100 and the electric fan-equipped stroller seat 1000 according to the embodiment, the main body 10 includes the spacers 11 for securing spaces inside. Air introduced by the electric fan. 200 is circulated more reliably inside the main body 10.

In the above embodiment, the air outlets 15 are provided on the front side of the main body 10. Alternatively, the entire front side of the body 10 may be an air outlet. For example, a portion farther from a connection with the extension 20 in the vertical direction may have higher breathability (for example, opening areas of a mesh are adjusted). It facilitates inflow of air introduced from the electric fan 200 to vertical ends of the main body 10.

Positions of the air outlets 15 may be adjustable.

In the above embodiment, the electric fan 200 and the power source 300 are connected by a power cable 400. The electric fan 200 and the power source 300 may be directly connected without the power cable 400. Alternatively, the fan 200 and the power source 300 may be integrated.

In that case, the fan mount 21 may be provided in each of the pair of extensions 20, 30. The electric fan 200 is provided in each of the fan mounts 21 it improves the cooling function. Since two electric fans 200 are provided, each electric fan 200 can be smaller as compared with a case where one electric fan 200 is provided.

In a case where the electric fan 200 and the power source 300 are directly connected, the extension 20 may be provided only on either the left or right side.

The extension 20 may be equipped only with the electric fan 200. The power source 300 is located outside the stroller seat 100 and power is supplied therefrom.

The spacers 11, the electric fan 200, the power source 300 and the power cable 400, which are arranged inside, can all be removed from the stroller seat 100. Thus, the stroller seat 100 can be washed.

Other specific detailed structures, etc. may also be changed as appropriate.

INDUSTRIAL APPLICABILITY

The present invention can be used for stroller seats and stroller seats with electric fans that realize more hygienic and efficient cooling.

REFERENCE SIGNS LIST 1 stroller
2 backrest
3 seat
4 shoulder belt
5 crotch belt
6 armrest
100 stroller seat
10 main body
10a side portion
10b side portion
11 spacer
12 shoulder belt hole
13 crotch belt hole
15 air outlet
20 extension
21 fan mount
21a mount hole
21b reinforcement member
30 extension
31 power source storage
200 electric fan
300 power source
400 power cable
1000 electric fan-equipped stroller seat

The invention claimed is:

1. A stroller seat which is configured to be put on a stroller and which comprises:
a main body which is configured to extend from a backrest to a seat of the stroller when put on the stroller, and which includes an inner space adapted to circulate air;
an extension which projects from at least one of two side portions of the main body so as to project more outward than other portions of the stroller seat, and which includes an inner space communicating with the inner space of the main body;
a fan mount which is provided in the extension; and
an electric fan mounted on the fan mount,
wherein:
the main body includes, on a front side as a seat side which is opposite the backrest of the stroller when the main body is put on the stroller, an air outlet which discharges inner air outward,
the electric fan mounted on the fan mount is configured to introduce air and to flow the introduced air into the main body through the extension, and
the extension is provided at a position that allows the extension to hang down from an armrest of the stroller when the stroller seat is put on the stroller.

2. The stroller seat according to claim 1, wherein:
the extension comprises a pair of extensions protruding in left and right directions from the two side portions of the main body,
the fan mount is provided in one of the pair of extensions, and
the stroller seat further comprises a power source storage which is provided in the other of the pair of extensions and in which a power source that drives the electric fan is stored.

3. The stroller seat according to claim 1, wherein:
the fan mount includes a mount hole, and
the electric fan is mounted so as to cover the mount hole.

4. The stroller seat according to claim 1, wherein the main body includes a spacer for securing the inner space.

* * * * *